(12) United States Patent
Liss et al.

(10) Patent No.: US 8,869,171 B2
(45) Date of Patent: Oct. 21, 2014

(54) LOW-LATENCY COMMUNICATIONS

(75) Inventors: Liran Liss, Atzmon (IL); Eugenia Emantayev, Shaked (IL); Yevgeny Petrilin, Yokneam Ilit (IL)

(73) Assignee: Mellanox Technologies Ltd., Yokneam (IL)

( * ) Notice: Subject to any disclaimer, the term of this patent is extended or adjusted under 35 U.S.C. 154(b) by 169 days.

(21) Appl. No.: 13/329,342

(22) Filed: Dec. 19, 2011

(65) Prior Publication Data
US 2012/0167119 A1 Jun. 28, 2012

Related U.S. Application Data

(60) Provisional application No. 61/426,534, filed on Dec. 23, 2010.

(51) Int. Cl.
*G06F 3/00* (2006.01)
*G06F 9/44* (2006.01)
*G06F 9/46* (2006.01)
*G06F 13/00* (2006.01)
*G06F 9/54* (2006.01)

(52) U.S. Cl.
CPC ..................................... *G06F 9/544* (2013.01)
USPC .......................................................... 719/318

(58) Field of Classification Search
None
See application file for complete search history.

(56) References Cited

U.S. PATENT DOCUMENTS

| | | | |
|---|---|---|---|
| 6,353,869 B1 * | 3/2002 | Ofer et al. ..................... | 710/200 |
| 6,748,460 B2 | 6/2004 | Brice, Jr. et al. | |
| 7,006,530 B2 * | 2/2006 | Spinar et al. .................. | 370/468 |
| 7,065,598 B2 * | 6/2006 | Connor et al. ................ | 710/260 |
| 7,720,925 B1 * | 5/2010 | Mehta et al. .................. | 709/207 |
| 7,779,178 B2 * | 8/2010 | Sarangam et al. .............. | 710/46 |
| 7,783,811 B2 * | 8/2010 | Worthington et al. ......... | 710/268 |
| 7,788,391 B2 | 8/2010 | Sen et al. | |
| 8,315,373 B1 * | 11/2012 | Flockhart et al. ......... | 379/266.06 |
| 2009/0201944 A1 * | 8/2009 | Aoki et al. .................... | 370/466 |

* cited by examiner

*Primary Examiner* — H S Sough
*Assistant Examiner* — William C Wood
(74) *Attorney, Agent, or Firm* — D. Kligler I.P. Services Ltd.

(57) ABSTRACT

A method of handling communications by a computer. A system-call communication routine receives a request of an application to perform a socket-related task on a given socket in a blocking mode. The routine repeatedly performs in alternation polling of one or more input/output (I/O) devices servicing the computer and performing the socket-related task.

24 Claims, 2 Drawing Sheets

LOW-LATENCY COMMUNICATIONS

CROSS-REFERENCE TO RELATED APPLICATION

This application claims the benefit of U.S. Provisional Patent Application 61/426,534, filed Dec. 23, 2010, which is incorporated herein by reference in its entirety.

FIELD OF THE INVENTION

The present invention relates generally to methods and devices for data communication, and specifically to system-calls used in communications.

BACKGROUND OF THE INVENTION

System-calls are used by computer user-applications to request services provided by an operating system (OS) kernel. System-call routines generally provide services which user programs usually do not have permission to perform and/or services which access shared resources moderated by the operating system. One field in which system-calls are widely used is computer communications. System-calls are used to create and terminate connections, send and receive messages and transfer status information.

Communications are generally performed by establishing a communication end point, referred to as a socket, which could be viewed as a type of mailbox. A user application manipulates the socket, and transfers data to/from the socket using system-calls.

Because communication functions, such as receiving data, depend on other processes running on the computer, on other hardware units of the computer and/or on remote units, communication system-calls may take a very long time to complete successfully. Various input/output (I/O) modes have been defined for the behavior of user applications while they are waiting for a communication operation to be performed. In a "blocking mode" or "blocking state", which is generally used by default, the user application waits for the communication operation to complete and does nothing until the system-call returns. In "non-blocking" mode, system-call routines accessing a socket return immediately to the user application, even if the task requested in the system-call was not completed yet.

As mentioned above, the communication operations generally depend on hardware communication devices, which copy received data into memory buffers. After data is placed in a buffer, an interrupt signal is generally sent to the operating system of the computer. The interrupt signal is handled by a driver corresponding to the device. The driver collects data from buffers containing newly arrived data and passes the data to an operating system communication stack, which directs the data to relevant sockets.

After an interrupt is raised by the device, it takes a considerable amount of time until the interrupt is dispatched to the interrupt handler. In addition, interrupts require processing resources for their handling and therefore devices are configured to wait a short amount of time before raising an interrupt, so that a plurality of events can be handled by a single interrupt. This, however, further adds to the latency of receiving data. There have been suggestions of systems which reduce the need for interrupts or avoid them altogether.

U.S. Pat. No. 6,748,460 to Brice Jr. et al., the disclosure of which is incorporated herein by reference, describes a method of handling I/O requests using a hierarchy of vector registers.

U.S. Pat. No. 7,788,391 to Sen et al., the disclosure of which is incorporated herein by reference, describes a system in which interrupts poll one or more devices in addition to performing their task. If the polled devices have pending requests, an interrupt to handle the pending requests is scheduled for handling after the current interrupt is completed.

SUMMARY

Embodiments of the present invention that are described below provide system-calls for communications.

There is therefore provided in accordance with an embodiment of the present invention, a method of handling communications by a computer, comprising receiving by a system-call communication routine running on the computer, a request of an application to perform a socket-related task on a given socket in a blocking mode; and responsively to the request, repeatedly performing in alternation, by the communication routine, polling one or more input/output (I/O) devices servicing the computer and performing the socket-related task.

Optionally, receiving the request comprises receiving a request to read data from the given socket and/or to determine a state of the given socket. Optionally the method includes generating a list of I/O devices which may provide data to the given socket and wherein polling one or more I/O devices comprises polling the I/O devices on the list. Optionally, polling one or more I/O devices comprises polling at least one I/O device not determined as being a possible source of data to the given socket. Optionally, polling one or more I/O devices comprises polling all I/O devices providing data to the computer. Optionally, polling the one or more I/O devices comprises polling a plurality of I/O devices, at least one of the I/O devices being polled more frequently than other polled devices.

Optionally, if, during polling, a device is determined to have received data, the communication routine initiates operation of a driver which handles transferring received data of the device to intended sockets. Optionally, the computer comprises a plurality of cores and wherein the communication routine is configured to initiate the driver on a core of the computer on which the system call was invoked.

Optionally, the socket-related task comprises determining a status of the given socket and/or retrieving data from the given socket. Optionally the method includes adjusting a scheduling scheme of a scheduler of the computer, responsive to the repeated alternate polling of the communication routine. Optionally the method includes wherein the scheduler is configured to allocate a shorter processing session to processes running the communication routine than to other processes. Optionally the method includes determining by the communication routine whether the socket-related task is to be performed in a blocking mode, and if not, performing the task in a non-blocking manner and returning control from the routine to the application that called the communication routine.

There is further provided in accordance with an embodiment of the present invention, a computer system, comprising at least one I/O device, at least one processor configured to run a system-call communication routine which receives requests from applications to perform a socket-related task on an indicated socket, and if the socket-related task is to be performed in a blocking mode, the communication routine repeatedly in alternation performs the following polls the at least one I/O device; and performs the socket-related task.

Optionally, the communication routine is configured to receive requests from a plurality of different processes.

Optionally, the at least one processor is configured to poll at least one I/O device not determined as being a possible source of data to the given socket.

There is further provided in accordance with an embodiment of the present invention, a computer software product, comprising a non-transitory computer-readable medium in which program instructions are stored, which instructions, when read by a computer, cause the computer to run a system-call communication routine which receives requests of processes to perform a socket-related task on an indicated socket in a blocking mode and repeatedly performs in alternation polling one or more I/O devices servicing the computer and performing the socket-related task.

Optionally, the communication routine is configured to receive requests from a plurality of different processes. Optionally, the system-call communication routine polls at least one I/O device not determined as being a possible source of data to the given socket.

The present invention will be more fully understood from the following detailed description of the embodiments thereof, taken together with the drawings in which:

DETAILED DESCRIPTION OF EMBODIMENTS

An aspect of some embodiments of the invention relates to communication system-call routines (referred to herein also as "system calls" for brevity) which when dealing with sockets in blocking mode, poll communication I/O devices in order to reduce the need for use of interrupts.

In some embodiments of the invention, the system-calls include receive system-calls and/or event notification system-calls.

Optionally, the system-calls poll the receive buffers of all the input/output (I/O) devices connected to the computer on which the system-calls operate. Alternatively, the system-calls generate a list of devices which may provide data to the socket for which the system-call was invoked and only the devices on the list are polled. Further alternatively, the system-calls poll only receive rings that may have data for the invoking socket.

Figure 1:
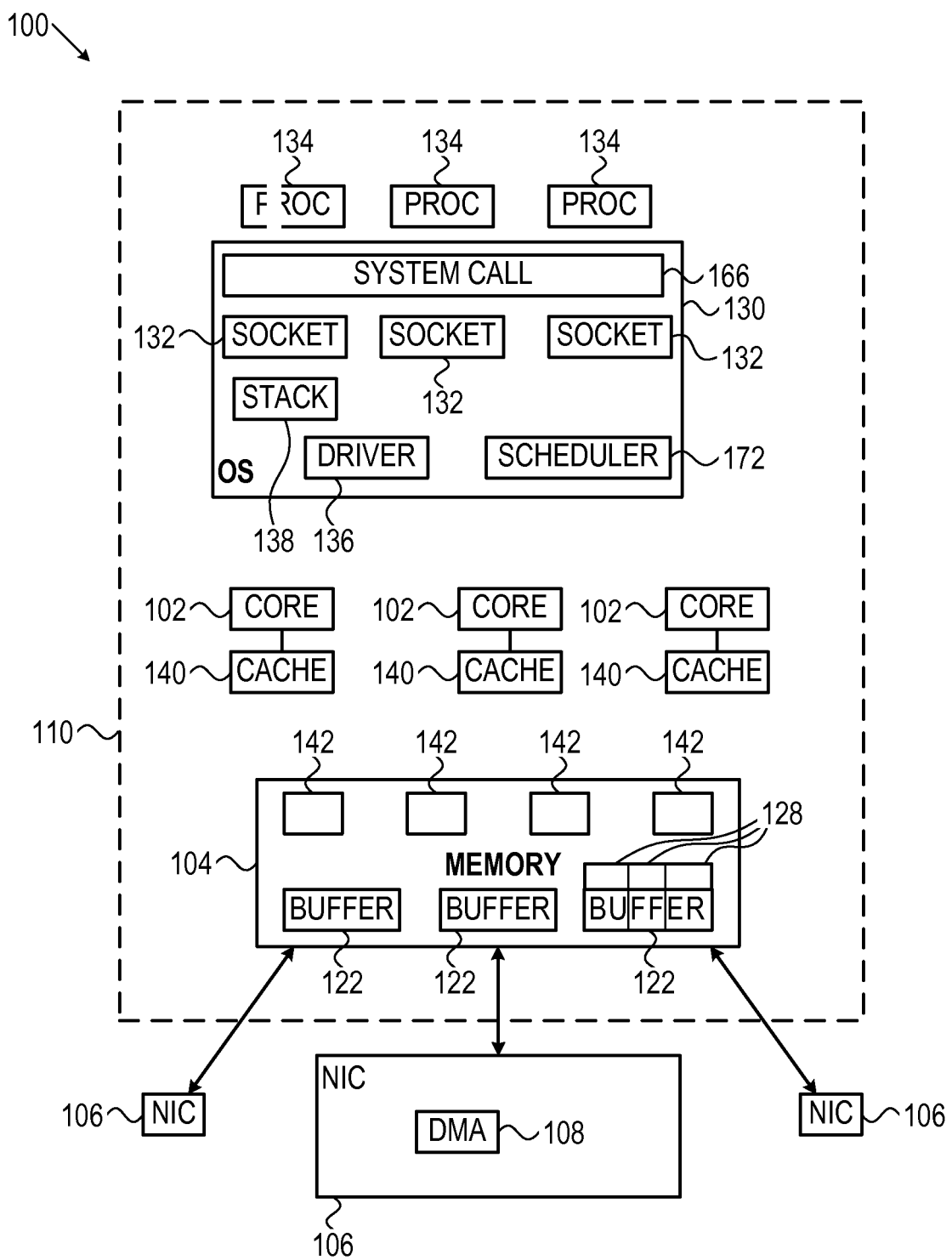
FIG. 1 is a schematic block diagram of a computer system, in accordance with an embodiment of the present invention.

FIG. 1 is a schematic block diagram of a computer system 100, in accordance with an embodiment of the present invention. Computer system 100 includes a computer 110 which comprises one or more processing cores 102 and a memory 104. In some embodiments of the invention, computer 110 includes for one or more cores 102 a corresponding memory cache 140. Computer 110 is connected to one or more network interface controllers (NIC) 106 and/or other communication devices. NICs 106 optionally include one or more direct memory access engines (DMAs) 108. When data directed to computer 110 is received by a NIC 106, a DMA 108 of the NIC copies the data into respective buffers 122 in memory 104. DMAs 108 optionally operate independently of cores 102, so that the reception of data does not require processing resources of the cores 102. In some embodiments of the invention, one or more of buffers 122 are organized into a plurality of separate buffer rings 128, which may be processed independently.

Computer 110 runs an operating system (OS) 130 and one or more user application processes 134. In order to communicate with external units through NICs 106, processes 134 initiate allocation of sockets 132, by OS 130. It is noted that the term socket is used herein broadly to refer to communication end points. Generally, each socket 132 may correspond to a single connection with an external device or may communicate with a plurality of external devices, for example, when using multicast or broadcast. Operating system 130 optionally runs drivers 136, which manage data buffers 122. When data is received in a buffer 122, drivers 136 optionally initiate the operation of an operating system network stack 138, which associates data in buffer 122 with intended sockets 132.

Operating system 130 generally includes a scheduler 172, which manages the scheduling of the application processes 134 for handling by cores 102, as is known in the art.

Processes 134 invoke system-call routines 166 in order to communicate with sockets 132. System-call routines 166 optionally include a data-reception system-call 166A, which is used to transfer received data from a socket 132 to user-application buffers 142, and one or more event notification system-calls 166B, which are used by processes 134 to determine the status of a socket 132.

System call routines 166 are typically designed to service a plurality of different applications and/or processes. For each process calling routine 166, the routine is executed in the context of the calling process, and is serviced by the core 102 and an associated cache 140 currently running the calling process.

The operating-system software and/or portions thereof used to implement embodiments of the present invention may be downloaded to computer system 100 in electronic form, over a network, for example. Alternatively or additionally, the software may be held on tangible, non-transitory storage media, such as optical, magnetic, or electronic memory media. For the sake of simplicity and clarity, only those elements of computer system 100 that are essential to an understanding of the present invention are shown in the figures.

Figure 2:
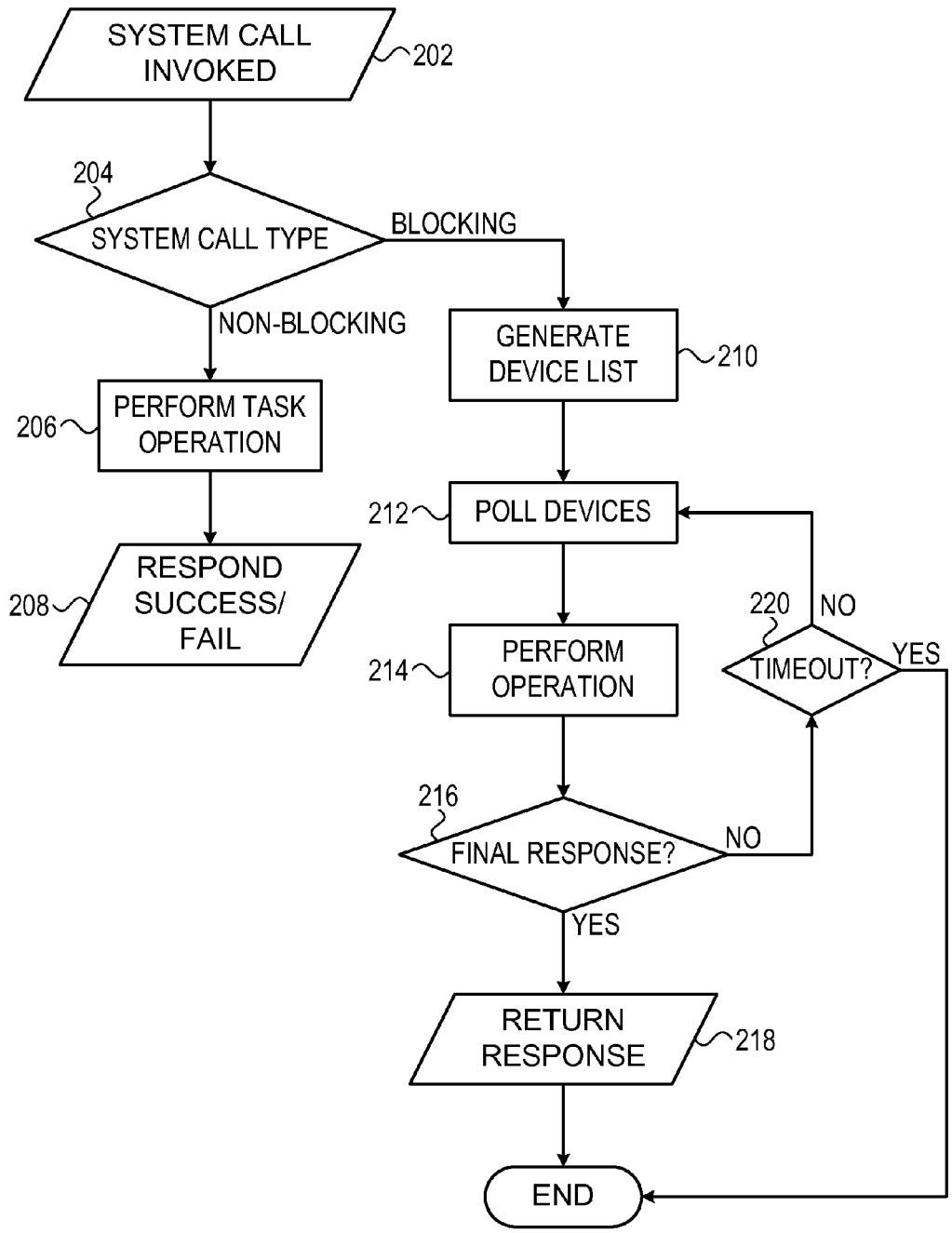
FIG. 2 is a flowchart of acts performed by a system-call routine, in accordance with an embodiment of the invention.

FIG. 2 is a flowchart of acts performed by a system-call routine 166, in accordance with an embodiment of the invention. Upon being invoked (202), system-call routine 166 determines (204) whether blocking or non-blocking mode should be used for accessing the referenced socket 132, using any suitable method known in the art.

If (204) non-blocking mode is used, routine 166 performs (206) a socket-related task which is the intended operation of the system-call and immediately responds (208) to the calling application 134 with an indication of whether the operation succeeded or failed. If (204), however, blocking mode is used, routine 166 generates (210) a list of NICs 106 to be polled, in order to speed up the completion of the operation of the system-call. Routine 166 then alternately polls (212) the NICs 106 on the list and performs (214) the socket-related task of the system-call in a non-blocking manner, until (216) the socket-related task returns a final response, e.g., returns data or an error other than reporting that no data is available. When (216) the final response is received, the response is returned (218) to the calling application 132 and routine 166 is terminated.

In some embodiments of the invention, a timeout period may be defined for sockets 132 and the alternate polling (212) and socket-related task performance (214) is stopped when the timeout period expires (220), even if a final response was not received. Alternatively or additionally, other stop conditions known in the art may be applied. For example, system-call routine 166 may be adapted to return immediately when the calling process has received a signal.

The method of FIG. 2 may be performed for various types of system-calls, including system-calls for receiving data and/or system-calls providing event notifications, such as poll, epoll and/or select system-calls.

For data reception system-calls, the socket-related task of the system-call (214) is generally to check whether data was received for a specific socket 132 and, if data was received, to copy the received data or a portion thereof into the application buffer 142. In "poll", "epoll" system calls, the socket related task notifies whether data was received by the socket or sockets associated with the system-call, but does not supply the data.

The polling (212) optionally comprises polling NICs 106 and/or buffer rings 128 thereof to determine whether there is newly received data in the buffer 122. If the polling identifies newly received data, driver 136 passes the buffers 122 containing the data to the operating system communication stack 138. The invoking of driver 136 by the polling system-call 166 reduces the latency of data reception, as there is no need to wait until NIC 106 invokes an interrupt to cause computer 110 to invoke driver 136. In addition, the invoking of driver 136 by the polling system-call reduces the use of interrupts, which require resources for the switching to and from the interrupt. It is noted, however, that the polling increases the CPU utilization.

In some embodiments of the invention, in invoking driver 136, the system-call invokes a driver 136 on the same core 102 as performing the polling. Thus, the data provided by the driver 136 will be easily available for the application calling the system-call, which is also running on the same core 102. This achieves a better cache utilization and/or reduces inter-core communications.

Alternatively, the generated list of devices includes for each NIC 106 on the list, an indication of the core 102 to run the driver 136 of the device. For example, when a NIC 106 is scheduled to receive data for a plurality of different sockets 132, the driver 136 may be scheduled to run on the core 102 hosting the largest number of applications scheduled to receive data from the device and/or the core 102 scheduled to receive the most data from the device.

In some embodiments of the invention, scheduler 172 is configured to schedule polling processes differently than other processes. Optionally, scheduler 172 assigns polling processes shorter running sessions, as their polling is relatively wasteful. In some embodiments of the invention, polling processes are assigned a shorter percentage of the processing power of computer 110. Alternatively, polling processes are assigned shorter processing sessions, but more often than other processes.

In some embodiments of the invention, the percentage of the processing power assigned to each polling process depends on the number of polling processes currently running on computer 110. Optionally, the more polling system-call routines 166 are running on the specific core 102 and/or on computer 110, the shorter the sessions assigned to each polling system call 166.

In many cases, the polling of NICs 106 will identify data that was received by the device, before the device generates an interrupt notifying a corresponding driver 136 that the data has arrived. In some embodiments of the invention, some or all of NICs 106 are configured to wait at least a predetermined period between copying data into a buffer 122 and generating an interrupt to the corresponding driver 136, in order to increase the probability that the polling by a system call routine 166 will be performed before the interrupt signal is sent. This may be performed, for example, using interrupt moderation schemes. Alternatively or additionally, system-call routine 166 is configured to mask interrupt generation on devices it is actively polling, such that interrupts are not generated on devices being polled.

Optionally, the moderation time that a NIC 106 waits before generating an interrupt is adjusted dynamically during system operation. In some embodiments of the invention, if polling was recently performed, a relatively long moderation period is used, since additional polling is expected and it is worth waiting for the polling to avoid performing the interrupt. In some embodiments, the moderation for recently polled devices is set to at least 200 microseconds, or even at least 500 microseconds.

It is noted that the use of interrupts in addition to the polling allows more flexibility in determining which devices to poll, as even if a device receiving data is not polled on time, the data will not be lost, since the interrupt mechanism provides a safety measure which makes sure the data will be handled. Therefore, in some embodiments, devices having a low chance of providing the required data are not polled, even if this means that some data directed to the socket will not be collected by the polling.

The terms alternately and "in alternation" are used herein broadly to relate to arrangements in which polling of devices and performing socket-related tasks are performed intermittently without limiting to any specific regularity of the performance of these operations. In some embodiments, a request to perform the socket-related task is submitted after each device polling (or after each sequence of polling the devices on the list) and vice versa. In other embodiments, a plurality of device polling rounds may be performed before one or more rounds of socket-related tasks. The same amount of time may be spent on the socket-related task and the device polling, or more time may be spent on one than on the other. For example, in a specific embodiment, 10 or more device polling rounds may be performed for each socket-related task.

Referring in detail to generating (210) a list of devices, in some embodiments of the invention, for simplicity, all the online NICs 106 connected to computer system 100, which support polling, are included in the polling list. Alternatively, for each socket 132 serviced by the system-call routine 166, the NICs 106 associated with the socket 132 are determined and added to the list. The determination of the associated devices optionally includes first determining the network interfaces, which may be physical and/or virtual interfaces (e.g., VLAN interfaces), that socket 132 may receive data from. Subsequently, each virtual interface is expanded to the underlying physical interfaces that are referenced by it. Finally, the list is optionally reviewed to remove duplicate entries of NICs 106. Further alternatively or additionally, the NICs 106 associated with any of the sockets 132 of computer system 100 are included in the polling list.

In other embodiments, for each socket 132, routine 166 includes on its polling list the buffer rings 128 associated with the core 102 hosting the calling application process 134. This generally achieves processing locality, resulting in lower latency and/or higher processing efficiency.

In some embodiments of the invention, all the NICs 106 on the list are polled at the same rate. Alternatively, different devices may be polled at different rates, for example according to the chances that the desired data is to be received by each polled NIC 106. Alternatively or additionally, the relative time spent on polling each device depends on the type of data received by each socket 132 and/or on quality of service (QoS) settings of the sockets 132.

In some embodiments of the invention, the rate at which each device on the list is polled, depends on one or more parameters of the data expected to be received from the device, such as the quality of service (QoS) rating of the data, the type of the data (e.g., video, audio, files) and/or the time constraints of the data (e.g., real-time or non-real-time).

When a NIC 106 includes a plurality of receive rings 128, the polling may be performed for all the rings 128 of the device or may be performed only for a subset of the rings. In some embodiments of the invention, polling is performed only for those rings 128 determined to provide data to the socket 132. In some embodiments of the invention, polling is performed only for those rings 128 associated with the core 102 on which the polling system-call routine 166 is running.

Optionally, all of NICs 106 are adapted to respond to polling. Alternatively, one or more of NICs 106 does not support polling and these NICs 106 are not polled by system-call routine 166.

In some embodiments of the invention, the list is generated once for each invocation of system-call routine 166. Alternatively, a single list is used by system-call routine 166 for a plurality of calls to the routine. In accordance with this alternative, the list is optionally updated periodically, for example after a predetermined number of calls to the routine and/or after a predetermined period. Further alternatively or additionally, the list is updated periodically during the operation of the routine 166 in response to a single call.

It is noted that if the list is empty no polling is performed and the operation of the system-call 166 may be performed in a blocking mode.

Referring in detail to polling (212), in some embodiments of the invention, routine 166 checks, before polling, that the polled NIC 106 is not being concurrently accessed by a different process. Optionally, before polling a NIC 106, routine 166 requests and receives exclusive access to the NIC. Optionally, if exclusive access to the buffer is not received, routine 166 moves to a next NIC 106 on the list. It is noted that the failure to achieve exclusive access may indicate that a different routine is polling the NIC 106 and therefore there is no need for the routine 166 to perform polling.

For NICs 106 which are associated with a plurality of receive rings 128, routine 166 optionally includes in the generated list indications of the rings 128 to be polled and the polling is performed on a per ring basis rather than on a per-device basis. Optionally, each time polling (212) is performed, routine 166 selects a next ring 128 to be polled, for example according to a round robin order. Each ring 128 is optionally polled until the ring is empty or at least a predetermined amount of data was extracted from the buffer 122. Then, routine 166 optionally moves to polling a next ring 128 of the same NIC 106 or of a different NIC.

The system-call routine 166 is optionally implemented by a kernel of operating system 130. Alternatively to the acts of FIG. 2 being performed by a system-call routine 166, in some embodiments of the invention the acts of FIG. 2 are performed by a regular communication routine (i.e., not a system-call routine), assigned to handle one or more communication NICs 106 that are shared among multiple user applications. Applications 134 call the regular routine which manages the communication device, rather than using system-calls directly.

It is noted that a NIC 106 may service many sockets 132 concurrently, such that the polling performed by polling routine 166 for a specific socket 132 may result in data reaching other sockets 132. This speeds the operation of these sockets 132 without adding latency to the calling socket 132 which is waiting for input data anyway.

It will be appreciated that the above described methods and apparatus are to be interpreted as including apparatus for carrying out the methods and methods of using the apparatus. It should be understood that features and/or steps described with respect to one embodiment may sometimes be used with other embodiments and that not all embodiments of the invention have all of the features and/or steps shown in a particular figure or described with respect to one of the specific embodiments. Tasks are not necessarily performed in the exact order described.

It is noted that some of the above described embodiments may include structure, acts or details of structures and acts that may not be essential to the invention and which are described as examples. Structure and acts described herein are replaceable by equivalents which perform the same function, even if the structure or acts are different, as known in the art. The embodiments described above are cited by way of example, and the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art. Therefore, the scope of the invention is limited only by the elements and limitations as used in the claims, wherein the terms "comprise," "include," "have" and their conjugates, shall mean, when used in the claims, "including but not necessarily limited to."

The invention claimed is:

1. A method of handling communications by a computer, comprising:
   receiving by a system-call communication routine running on the computer, a request of an application to perform a socket-related task on a given socket in a blocking mode;
   selecting a timing scheme for polling of a plurality of devices, in which different devices are assigned a different polling rate, the polling rate assigned to a specific device being assigned according to one or more parameters of data expected to be received from the specific device or a chances that the specific device will fulfill the received request; and
   responsively to the request, repeatedly performing in alternation, by the communication routine, the following:
      polling a plurality of input/output (I/O) devices, in accordance with the selected timing scheme, at least one of the I/O devices being polled more frequently than other polled devices; and
      performing the socket-related task.

2. The method of claim 1, wherein receiving the request comprises receiving a request to read data from the given socket.

3. The method of claim 1, wherein receiving the request comprises receiving a request to determine a state of the given socket.

4. The method of claim 1, comprising generating a list of I/O devices which are suspected as providing data to the given socket and wherein polling one or more I/O devices comprises polling the I/O devices on the list.

5. The method of claim 1, wherein polling one or more I/O devices comprises polling at least one I/O device not determined as being a possible source of data to the given socket.

6. The method of claim 5, wherein polling one or more I/O devices comprises polling all I/O devices providing data to the computer.

7. The method of claim 1, wherein if, during polling, a device is determined to have received data, the communication routine initiates operation of a driver which handles transferring received data of the device to intended sockets.

8. The method of claim 7, wherein the computer comprises a plurality of cores and wherein the communication routine initiates the driver on a core of the computer on which the system call was invoked.

9. The method of claim 1, wherein the socket-related task comprises determining a status of the given socket.

10. The method of claim 1, wherein the socket-related task comprises retrieving data from the given socket.

11. The method of claim 1, comprising adjusting a scheduling scheme of a scheduler of the computer, responsive to the repeated alternate polling of the communication routine.

12. The method of claim 11, wherein the scheduler allocates a shorter processing session to processes running the communication routine than to other processes.

13. The method of claim 1, comprising determining by the communication routine whether the socket-related task is to be performed in a blocking mode, and if not, performing the task in a non-blocking manner and returning control from the routine to the application that called the communication routine.

14. The method of claim 1, comprising selecting a rate at which each device is polled responsive to an estimate of a probability that data expected by the socket will be received from the device.

15. The method of claim 1, comprising selecting a rate at which each device is polled responsive to a quality of service rating or type of data expected to be received through the device.

16. The method of claim 1, comprising adjusting a moderation time that one or more of the devices waits before generating an interrupt, responsive to the polling.

17. A computer system, comprising:
at least one I/O device;
at least one processor configured to run a system-call communication routine which receives requests from applications to perform a socket-related task on an indicated socket, and if the socket-related task is to be performed in a blocking mode, the communication routine repeatedly in alternation performs the following:
polls the at least one I/O device; and
performs the socket-related task,
wherein the processor is further configured with a scheduler which schedules processing sessions to processes running on the processor, the scheduler being configured to adjust its scheduling scheme of processing sessions to processes responsive to the communication routine of one of the processes repeatedly polling in alternation.

18. The computer system of claim 17, wherein the communication routine is configured to receive requests from a plurality of different processes.

19. The computer system of claim 17, wherein the at least one processor is configured to poll at least one I/O device not determined as being a possible source of data to the given socket.

20. The computer system of claim 17, wherein the scheduler is configured to allocate a shorter processing session to processes running the communication routine repeatedly polling in alternation than to other processes.

21. The computer system of claim 17, wherein the scheduler is configured to allocate processing sessions to processes running the communication routine more often than to other processes.

22. A computer software product, comprising a non-transitory computer-readable medium in which program instructions are stored, which instructions, when read by a computer, cause the computer to run a system-call communication routine which:
receives requests of processes to perform a socket-related task on an indicated socket in a blocking mode; and
responsively to receiving a request to perform a socket-related task, repeatedly performs in alternation:
polling one or more I/O devices servicing the computer, including at least one I/O device not determined as being a possible source of data to the indicated socket; and
performing the socket-related task.

23. The product of claim 22, wherein the communication routine is configured to receive requests from a plurality of different processes.

24. The product of claim 22, wherein the system-call communication routine polls all I/O devices providing data to the computer.

* * * * *